United States Patent Office 2,809,999
Patented Oct. 15, 1957

2,809,999

PREPARATION OF 2,6-DIMETHYLOL PHENOLS

Max E. Chiddix, Easton, Stanley H. Hesse, Bethlehem, and Marjorie R. Williams, Pen Argyl, Pa., assignors to General Aniline & Film Corporation, New York, N. Y., a corporation of Delaware No Drawing. Application December 13, 1955, Serial No. 552,728

11 Claims. (Cl. 260—620)

This invention relates to an improved method for preparing 2,6-dimethylol phenols.

The process for preparing 2,6-dimethylol phenols from the corresponding 2,6-unsubstituted phenols by reaction with two moles of formaldehyde in the presence of alkali is well known in the prior art. All of the known processes require reaction at temperatures no higher than 50° C. for long periods of time ranging from 24 hours to a week in duration, apparently in order to maintain the yield of pure product and to reduce the formation of resinous by-products. Thus, J. B. Niederl (Ind. Eng. Chem. 30, 1272) prepared the dimethylol derivative of p-diisobutylphenol by allowing the phenol to stand one week in an aqueous solution of caustic and formaldehyde. Strating and Backer (Rec. trav. Chim. 62, 57–67, 1943) heated 3,4,5-trichlorophenol for five days in a sealed tube at 50° C. with caustic and formaldehyde to produce the dimethylol derivative in a yield of 78%. Example 3 of German Patent No. 510,447 discloses the production of 2,6-dimethylol-4-chlorophenol by adding formaldehyde to a solution of parachlorophenol and heating for 24 hours at 50° C. Example 4 of the same patent discloses the production of 2,6-dimethylol-4-bromophenol by adding formaldehyde to a solution of parabromophenol and heating for 48 hours at 40 to 45° C. The latter process has been found to give a yield of no more than about 75% of a product having a melting point of 156 to 158° C. Openshaw and Robinson (J. Chem. Soc. 1946, 912–18) produced an 85% yield of the sodium salt of 2,6-dimethylol-4-chlorophenol by following the procedure of Example 3 of German Patent No. 510,447 but at 30 to 40° C. for 3 days.

Attempts to shorten the reaction time to render the above described processes more susceptible to commercial utilization by the obvious expedient of increasing the reaction temperatures have resulted in decreased yields of the desired product, presumably due to formation of resinous by-products and the like. For example, when the reaction temperature of the process of Openshaw and Robinson was raised to 55 to 60° C. and the reaction time reduced to 3 hours, there was obtained a product having a melting point of about 154 to 156° C. in a yield of about 60.5 percent.

It is an object of this invention to provide an improved process for the production of 2,6-dimethylol phenols. Another object of this invention is the provision of a process for producing 2,6-dimethylol phenols in good yields and in a reduced period of time. Other objects and advantages will appear as the description proceeds.

The attainment of the above objects is made possible by the instant invention which includes a process for preparing a 2,6-dimethylol phenol comprising continuously adding an aqueous solution containing about 1 mole of a phenol unsubstituted in the 2,6-positions and about 1 mole of an alkali metal hydroxide to an aqueous solution containing about 2 moles of formaldehyde at a temperature of about 55 to 80° C., and maintaining the resulting mixture within said temperature range to complete the reaction. It has been found that the above defined process of this invention enables the production of good yields of the desired 2,6-dimethylol derivative in reaction durations of from about 3 to 8 hours. While the reason for the improved results herein is not fully understood, it is believed that the excess of formaldehyde maintained during addition of the phenol thereto lessens the tendency to form diphenyl methanes and resins while enabling the use of higher temperatures in a range previously regarded as undesirable for that reason.

The process of this invention is applicable for the reaction with formaldehyde of any phenol containing no substituents in the 2- and 6-positions. The 3-, 4-, and 5-positions may contain substituents which do not interfere with the progress of the desired reaction. In general, the phenols preferred for use in the instant process have the following formula

wherein X is selected from the group consisting of hydrogen, chlorine and bromine; and Y is selected from the group consisting of chlorine, bromine, phenyl and lower alkyl such as methyl, ethyl, and the like.

Sodium hydroxide is preferred as the alkali metal hydroxide in the instant invention, but potassium hydroxide may also be employed. The alkali metal hydroxide may be employed in proportions of about 0.8 to 1.2 moles per mole of the phenol reactant.

In carrying out the reaction, either the phenol reactant or the formaldehyde reactant may be employed in slight excess depending upon the particular components and conditions of reaction, and the desired results with respect to reaction equilibriums, desirability of unreacted components in the product, and the like. The solution containing the phenol and alkali metal hydroxide may if desired contain water in excess of the amount necessary to dissolve the said components, such excess tending to inhibit resin formation. The upper limit of water content is dependent primarily on convenience in handling, equipment employed, and the like. Said solution is gradually added to the formaldehyde solution at a temperature ranging from about 55 to 80° C. over a period of from about ½ to 2½ hours, and the reaction mixture then maintained within the same temperature range until the reaction is completed. The reaction is conducted under alkaline conditions e. g. above a pH of about 9. Temperatures much above or below the aforementioned range of 55 to 80° C. have been found to be undesirable, particularly with respect to yield of pure product obtained. Generally, the reaction is complete within a period of from about 4 to 8 hours, including the time taken for addition of the phenol-alkali metal hydroxide solution to the formaldehyde solution. The melting point of the reaction product of 4-chlorophenol with formaldehyde should fall within the range of 158 to 165° C. Decreasing melting points usually indicate the presence of increasing amounts of impurities, such as unreacted reactants, diphenylmethanes, and/or resinous by-products. Darker colors also indicate the presence of such impurities. Yields of the order of about 80% or more are made possible by the process of the instant invention.

The following examples, in which parts are by weight unless otherwise indicated, are illustrative of the instant invention and the criticality of the manner of its operation and are not to be regarded as limitative.

EXAMPLE 1

5-chloro-2-hydroxy-α,α'-m-xylenediol

In a 250 ml. flask equipped with stirrer, thermometer, and dropping funnel was placed 43 g. (0.50 mole) 35% aqueous formaldehyde. The formaldehyde was heated to 65° C. A mixture of 32.1 g. (0.25 mole) 4-chlorophenol and 10.0 g. (0.25 mole) sodium hydroxide pellets dissolved in 40 ml. water was added to the formaldehyde at 65–70° C. in 1½ hours. The reaction mixture was heated to 75° C. in 25 minutes and held at 75–80° C. for 3 hours. The reaction mixture was cooled to 20° C. and acidified to Congo blue with 17 ml. concentrated (37%) hydrochloric acid. The product was filtered and washed acid-free with water. The dry crude white product weighed 37.9 g. (80.5% of the theoretical yield) and had a melting point of 158–160° C.

Similar results with respect to yield, melting point, and the like, are obtained when the process of this example is carried out at 55 to 60° C. or at 65 to 70° C. for 3 to 4 hours.

EXAMPLE 2

(Illustrates the effect of higher temperature)

The procedure of Example 1 was followed except that the phenol-caustic mixture was added at 0–10° C., and the reaction mixture was then stirred at 95–100° C. for one hour. At the end of this time the mixture was no longer alkaline to phenolphthalein. The mixture was made slightly acid with glacial acetic acid, and stirring was continued until the orange-colored oil had solidified. The solid was filtered, washed with water, and air-dried. The dry crude product weighed 24.1 g. (51.1% of theoretical yield) and had a melting point of 136–141° C. with softening at 127° C. The color was dark orange.

EXAMPLE 3

(Illustrates the effect of lower temperature)

The procedure of Example 1 was used except that the phenol-caustic mixture was added to the formaldehyde at 0–10° C., and the reaction mixture was stirred at 45–50° C. for four hours. The yield was 38.9% and the crude product had a melting point of 161–2° C.

EXAMPLE 4

5-methyl-2-hydroxy-α,α'-m-xylenediol

In a 2000 ml. flask equipped with stirrer, thermometer, and dropping funnel was placed 430 g. (5 moles) 35% aqueous formaldehyde. The formaldehyde was heated to 65° C. A mixture of 269 g. (2.5 moles) p-cresol and 100 g. (2.5 moles) sodium hydroxide pellets dissolved in 400 ml. water was added to the formaldehyde at 55–60° C. in 1½ hours. The reaction mixture was stirred an additional 15 minutes, when the crystalline product began to separate and within 5 minutes the entire reaction mixture had thickened. It was allowed to cool to room temperature, filtered by suction and the filter cake washed with 100 ml. cold water. The filter cake was slurried in 1500 ml. water and acidified to Congo blue with 180 ml. concentrated (37%) hydrochloric acid. The product was filtered and washed acid-free with water. After crystallization from ethanol it had a melting point of 128–9° C.

EXAMPLE 5

5-phenyl-2-hydroxy-α,α'-m-xylenediol

In a 2000 ml. flask equipped with stirrer, thermometer, and dropping funnel was placed 172 g. (2 moles) 35% aqueous formaldehyde. The formaldehyde was heated to 65–70° C. A warmed mixture of 170 g. (1 mole) β-hydroxydiphenyl and 40 g. (1 mole) sodium hydroxide pellets dissolved in 800 ml. water was added dropwise to the formaldehyde at 65–70° C. The reaction mixture was held at 65–70° C. for 4 hours, then cooled to 15° C. and acidified to Congo blue with acetic acid. The product was filtered and washed acid-free with water. The dry crude product weighed 206 g. (90% of the theoretical yield) and had a melting point of 98–100° C. Recrystallization from toluene raised the melting point to 107–9° C.

EXAMPLE 6

4,5-dichloro-2-hydroxy-α,α'-m-xylenediol

In a 250 ml. flask equipped with a stirrer, thermometer, and dropping funnel was placed 42.2 g. (.52 mole) 35% aqueous formaldehyde. The formaldehyde was heated to 65–70° C. A mixture of 40.8 g. (.25 mole) 3,4-dichlorophenol and 10 g. (.25 mole) sodium hydroxide pellets dissolved in 50 ml. water was added to the formaldehyde in 15 minutes. The reaction mixture was heated at 65–70° C. for an additional 4 hours. The reaction mixture was cooled to room temperature, diluted with 500 ml. water, and acidified to Congo blue with concentrated (37%) hydrochloric acid. The product was filtered and washed acid-free with water. The dry crude, light orange product weighed 46.7 g. (83.7% of the theoretical yield) and had a melting point of 142–4° C. Crystallization from ethanol raised the melting point to 148–9° C. Analysis for C: theory 43.08, found 42.85, 42.96; for H: theory 3.61, found 3.81, 3.82.

EXAMPLE 7

5-bromo-2-hydroxy-α,α'-m-xylenediol

The procedure of Example 1 was followed except that 43.3 g. (.25 mole) p-bromophenol was used in place of p-chlorophenol and the addition was made in 25 minutes. When the addition was complete the reaction mixture was stirred at 65–70° C. for 2¾ hours, cooled to room temperature, and acidified to Congo blue with 12 ml. concentrated (37%) hydrochloric acid. The product was filtered and washed acid-free with water. The dry crude product weighed 43.8 g. (77.4% of the theoretical yield) and had a melting point of 155–7° C. Recrystallization from ethanol gave a product melting at 155.0–5.5° C. Analysis for C: theory 41.22, found 41.14; for H: theory 3.89, found 3.93.

EXAMPLE 8

(Procedure of Example 3 of German Patent No. 510,447)

In a 500 ml. 3-necked flask equipped with a thermometer, stirrer, and air-cooled condenser was charged 32.1 g. (0.25 mole) 4-chlorophenol, 10.4 g. (0.26 mole) sodium hydroxide dissolved in 22 ml. water, 56 g. (0.65 mole) 35% aqueous formaldehyde, and 150 ml. water. The reaction mixture was stirred at 50° C. for 24 hours, then cooled to room temperature, and acidified with 18 ml. concentrated (37%) hydrochloric acid. The solid was collected by filtration and subjected to steam distillation until the distillate showed a negative test for phenol with ferric chloride solution. The residue from the steam distillation was filtered off after cooling to room temperature. The dry solid weighed 29.2 g. (62% of theory) and had a melting point of 158° C. Upon standing the filtrate yielded 6.1 g. (13% theory) of product which melted at 156° C.

EXAMPLE 9

When the procedure of Example 4 was repeated, but employing a reaction temperature of 55 to 60° C., for 3 hours, a product having a melting point of 154 to 156° C. was obtained in a yield of 60.5% of theory.

The products of the instant invention may be employed in known manner for the production of polymers therefrom, being condensates of phenol and formaldehyde. They may also be employed for reaction with 1 or 2 moles of a halogenated phenol to produce products having germicidal and fungicidal properties. For example, the product of Example 1 herein may be reacted with two moles of 2,4-dichlorophenol to produce 4-chloro-α²,α⁶-bis(3,5-dichloro-2-hydroxyphenyl)-2,6-xylenol in accordance with the following equation:

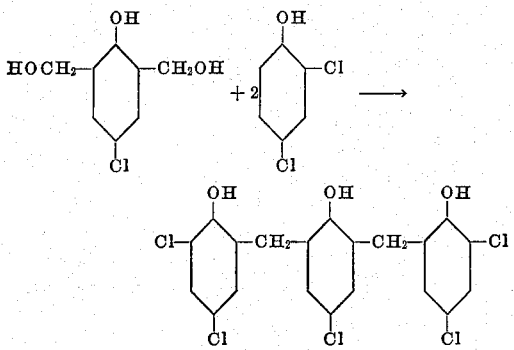

The product of the latter reaction has valuable germicidal and fungicidal properties, particularly when employed in soap and/or synthetic detergent compositions. Said product and its method of manufacture is disclosed and claimed in the copending application of Max E. Chiddix, Serial No. 216,110, filed March 16, 1951, and now abandoned.

This invention has been disclosed with respect to certain preferred embodiments thereof, and various modifications and variations thereof will become obvious to persons skilled in the art. It is to be understood that such modifications and variations are to be included within the spirit and purview of this application and the scope of the appended claims.

We claim:

1. A process for preparing a 2,6-dimethylol phenol comprising continuously adding an aqueous solution containing about 1 mole of a phenol unsubstituted in the 2,6-positions and about 1 mole of an alkali metal hydroxide to an aqueous solution containing about 2 moles of formaldehyde at a temperature of about 55 to 80° C., and maintaining the resulting mixture within said temperature range for a time sufficient to complete the reaction.

2. A process as defined in claim 1 wherein the alkali metal hydroxide is sodium hydroxide.

3. A process as defined in claim 1 wherein the said addition and the said maintenance of the resulting mixture within the said temperature range is carried out within a period of about 3 to 8 hours.

4. A process for preparing a 2,6-dimethylol phenol having the formula

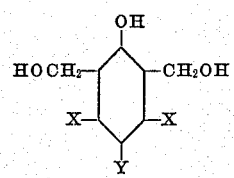

wherein X is selected from the group consisting of hydrogen, chlorine and bromine, and Y is selected from the group consisting of chlorine, bromine, phenyl, methyl and ethyl comprising continuously adding an aqueous solution containing about 1 mole of a phenol having the formula

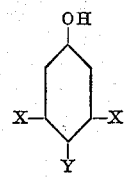

wherein X and Y have the values given above, and about 1 mole of an alkali metal hydroxide to an aqueous solution containing about 2 moles of formaldehyde at a temperature of about 55 to 80° C., and maintaining the resulting mixture within said temperature range for a time sufficient to complete the reaction.

5. A process as defined in claim 4 wherein said alkali metal hydroxide is sodium hydroxide.

6. A process as defined in claim 4 wherein the said addition and the said maintenance of the resulting mixture within the said temperature range is carried out within a period of about 3 to 8 hours.

7. A process for preparing 5-chloro-2-hydroxy-α,α'-m-xylendiol comprising continuously adding an aqueous solution containing about 1 mole of 4-chlorophenol and about 1 mole of sodium hydroxide to an aqueous solution containing about 2 moles of formaldehyde at a temperature of about 55 to 80° C., and maintaining the resulting mixture within said temperature range for a time sufficient to complete the reaction.

8. A process for preparing 5-methyl-2-hydroxy-α,α'-m-xylendiol comprising continuously adding an aqueous solution containing about 1 mole of p-cresol and about 1 mole of sodium hydroxide to an aqueous solution containing about 2 moles of formaldehyde at a temperature of about 55 to 80° C. and maintaining the resulting mixture within said temperature range for a time sufficient to complete the reaction.

9. A process for preparing 5-phenyl-2-hydroxy-α,α'-m-xylendiol comprising continuously adding an aqueous solution containing about 1 mole of p-hydroxydiphenyl and about 1 mole of sodium hydroxide to an aqueous solution containing about 2 moles of formaldehyde at a temperature of about 55 to 80° C., and maintaining the resulting mixture within said temperature range for a time sufficient to complete the reaction.

10. A process for preparing 4,5-dichloro-2-hydroxy-α,α'-m-xylendiol comprising continuously adding an aqueous solution containing about 1 mole of 3,4-dichlorophenol and about 1 mole of sodium hydroxide to an aqueous solution containing about 2 moles of formaldehyde at a temperature of about 55 to 80° C., and maintaining the resulting mixture within said temperature range for a time sufficient to complete the reaction.

11. A process for preparing 5-bromo-2-hydroxy-α,α'-m-xylendiol comprising continuously adding an aqueous solution containing about 1 mole of p-bromophenol and about 1 mole of sodium hydroxide to an aqueous solution containing about 2 moles of formaldehyde at a temperature of about 55 to 80° C., and maintaining the resulting mixture within said temperature range for a time sufficient to complete the reaction.

References Cited in the file of this patent

UNITED STATES PATENTS

| | | |
|---|---|---|
| 2,630,458 | Moyle et al. | Mar. 3, 1953 |
| 2,710,305 | Martin | June 7, 1955 |